(12) United States Patent
Simpson et al.

(10) Patent No.: US 8,682,706 B2
(45) Date of Patent: Mar. 25, 2014

(54) TECHNIQUES FOR TEMPORARILY HOLDING PROJECT STAGES

(75) Inventors: Michel Shane Simpson, American Fork, UT (US); Volker Gunnar Scheuber-Heinz, Pleasant Grove, UT (US); Lee Edward Lowry, Orem, UT (US); Stephen R. Carter, Spanish Fork, UT (US)

(73) Assignee: Apple Inc., Cupertino, CA (US)

( * ) Notice: Subject to any disclaimer, the term of this patent is extended or adjusted under 35 U.S.C. 154(b) by 1184 days.

(21) Appl. No.: 11/831,249

(22) Filed: Jul. 31, 2007

(65) Prior Publication Data
US 2009/0037198 A1    Feb. 5, 2009

(51) Int. Cl.
*G06Q 10/00*    (2012.01)

(52) U.S. Cl.
USPC .................. 705/7.23; 705/7.25; 705/7.26

(58) Field of Classification Search
USPC .................. 705/1.1, 7.23, 7.25, 7.26
See application file for complete search history.

(56) References Cited

U.S. PATENT DOCUMENTS

| | | | |
|---|---|---|---|
| 6,145,119 A | | 11/2000 | House et al. |
| 6,256,773 B1 * | | 7/2001 | Bowman-Amuah .......... 717/121 |
| 6,324,647 B1 * | | 11/2001 | Bowman-Amuah ............ 726/23 |
| 7,139,999 B2 * | | 11/2006 | Bowman-Amuah .......... 717/101 |
| 7,174,348 B1 | | 2/2007 | Sadhu et al. |
| 7,212,987 B2 * | | 5/2007 | Swanke et ......................... 705/9 |
| 2003/0046681 A1 * | | 3/2003 | Barturen et al. .............. 717/177 |
| 2003/0126003 A1 | | 7/2003 | vom Scheidt et al. |
| 2003/0217062 A1 | | 11/2003 | Thomas et al. |
| 2004/0039771 A1 | | 2/2004 | Steinel et al. |
| 2004/0139176 A1 * | | 7/2004 | Farrell et al. .................. 709/220 |
| 2005/0102157 A1 | | 5/2005 | Soma et al. |
| 2005/0144271 A1 * | | 6/2005 | Shirane et al. ................ 709/223 |
| 2005/0149342 A1 * | | 7/2005 | Chao et al. ........................ 705/1 |
| 2006/0025997 A1 * | | 2/2006 | Law et al. ...................... 704/257 |
| 2006/0041440 A1 | | 2/2006 | Cheng et al. |
| 2006/0120353 A1 * | | 6/2006 | Farrell et al. .................. 370/352 |
| 2006/0276708 A1 * | | 12/2006 | Peterson et al. .............. 600/416 |
| 2007/0061154 A1 * | | 3/2007 | Markvoort et al. ............... 705/1 |
| 2008/0177708 A1 * | | 7/2008 | Ayyar et al. ...................... 707/3 |
| 2008/0208665 A1 * | | 8/2008 | Bull et al. ......................... 705/8 |

OTHER PUBLICATIONS

Google Patent Searches, Oct. 29, 2013, pp. 1-2.*
Jorgensen, N., "Putting it All in the Trunk: Incremental Software Development..Open Source Project", Information Systems Journal, 2001, pp. 1-19.*
Project Management Lifecycle, Aug. 9, 2003, New York State Office of Information, pp. 1-49.*

* cited by examiner

*Primary Examiner* — Dean T Nguyen
(74) *Attorney, Agent, or Firm* — Fletcher Yoder PC

(57) ABSTRACT

Techniques for temporarily holding project stages are provided. Resources and configuration information associated with a source stage of project's lifecycle are imaged in a self-contained project package. The package is published to an intermediate holding area. The package is pulled to and initiated within a target stage of the project's lifecycle when release and access criteria are satisfied.

10 Claims, 3 Drawing Sheets

TECHNIQUES FOR TEMPORARILY HOLDING PROJECT STAGES

BACKGROUND

Increasingly enterprises and governments are turning to technology to automate and streamline their internal operations and business processes. Furthermore, the advent of the Internet and the World-Wide Web (WWW) has allowed enterprises and governments to deliver goods and services in an automated and nearly instantaneous fashion across the entire globe.

With any good or service provided by an enterprise or a government, there can be potentially a myriad of activities and expenses associated with those activities, which the enterprise or government endures before the good or service is available in the marketplace for consumption.

For example, word processing software has to be initially defined, developed and tested before it can be released for sale. These activities are usually managed internally by high-salaried project managers. For the most part, the project managers are administrators with skill in acquiring other personnel and equipment within an enterprise to make a project move from conception and development to release. In some cases, projects are so large within an enterprise that multiple layers of project managers are needed for any given project.

In large part, the industry has not been able to successfully automate and streamline the project management process. As a result, the cost of goods and services are likely unduly inflated and the time-to-market for goods and services is longer than it probably should be.

One reason for this lack of automation is the perceived complexity associated with project management in general. There are a variety of considerations such as laws, regulations, internal procedures that have to be followed. In addition, there may be limited personnel with specific skill sets some of which may be in high demand and unavailable within the enterprise and some of which the enterprise does not have and will have to contract out or hire in order to obtain.

Moreover, even when a manually implemented project management system is in place within an enterprise, the technique used to transition a project between stages is a push method. In other words, when a project is ready to move to a next stage of its lifecycle it is pushed from its current stage to the next stage. But there may be many circumstances in which a push technique is not desirable.

For example, with today's mobile computing environment a next stage of a project may be associated with a laptop that is offline when the desired push from a current stage is attempted. In another scenario, the next stage's processing environment may not be configured and ready for operation when the push is attempted. In yet another case, the user pushing from the current stage may have not access rights to push to the next stage.

As a result, even with automated and manual approaches the traditional push approach is deficient in many situations.

Thus, what is needed is an automated and flexible mechanism, which allows for improved project transitioning between stages of its lifecycle that extend beyond the conventional push approach.

SUMMARY

In various embodiments, techniques for temporarily holding project stages before transitioning them to target stages of a project's lifecycle are provided. More specifically, and in an embodiment, a method is provided for packaging and facilitating the temporarily holding a project stage. Configuration information and resources for a project within a source stage of a lifecycle for the project are packaged to create a self-contained project package. The source stage is associated with a source processing environment. Next, the project package is created to include release criteria and access criteria that when satisfied permits the project package to be acquired and instantiated within a target stage of the lifecycle; the target stage is associated with a target processing environment. Finally, the project package and the release and access criteria are transmitted to a remote and an external holding area for subsequent retrieval by an authorized principal into the target stage when the release and access criteria are satisfied.

DETAILED DESCRIPTION

Figure 1:
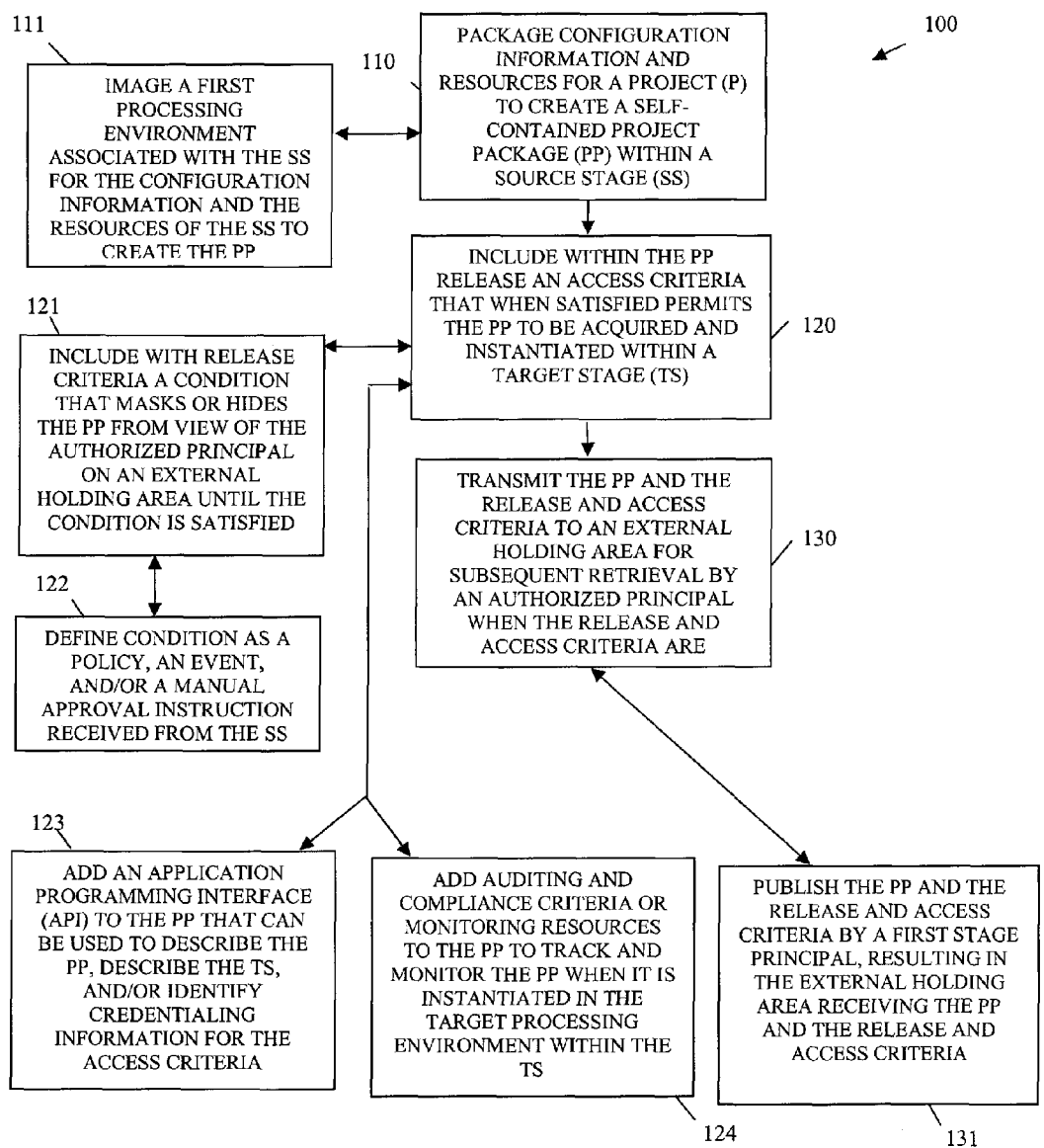
FIG. 1 is a diagram of a method for packaging a project within a source stage, according to an example embodiment.

A "resource" includes a user, content, a processing device, a node, a service, an application, a system, a schema definition, a directory, an operating system (OS), a file system, a data store, a database, a policy definition, a configuration definition, a file, content, a World-Wide Web (WWW) service, a WWW page, groups of users, combinations of these things, etc. The terms "service," "application," and "system" may be used interchangeably herein and refer to a type of software resource that includes instructions, which when executed by a machine performs operations that change the state of the machine and that may produce output.

A "principal" is a special type of resource that performs one or more actions against other resources. So a principal may be a user or an automated service.

In an embodiment, each resource is electronically defined and represented as having one or more attributes. Each attribute includes one or more name value pairs. For example, a server resource may include an attribute associated with its physical Internet Protocol (IP) address and that attribute may be represented by the following name value pair: "IP=100.1.1.10." The server resource may also have its own identity (discussed below) and may include other attributes such as whether the IP address is static or dynamic, etc. Attributes may also include references to policy or even specific configuration details for a given processing environment that a resource is to be deployed to.

A "project" refers to the activity associated with an enterprise or government producing a good (product) or personal service (e.g., financial advice, etc.) for consumption in the marketplace. The activity for the project is defined in various stages of the project's lifecycle, such as by way of example only project definition, project development, project testing, project release, etc. Thus, a "project" is represented and electronically defined as a series of stages associated with the project's lifecycle. Each stage includes its own processing environment having its own or shared resources. So, a stage is represented and electronically defined as one or more resources and their relationships with other resources of the same stage or a different stage. A project may also be viewed as a type of resource.

A virtual project is one that includes other sub projects or nested projects. Some resources associated with a virtual project may be instantiated and ready for use while others are configured and instantiated according to policy.

Projects and virtual projects are defined via configuration data, metadata, policy, and other directives or statements that can be interpreted by and acted upon by other services or resources to logically assemble and define a collection of resources as a particular project or meta resource. As used here a project can include one or more virtual projects or references to nested sub and independent projects.

A "self-contained project package" includes the project package and includes the resources that the project relies on in its next target stage. The self-contained project package may also include configuration information for configuring and initiating resources in a target processing environment associated with the target stage. The resources and any needed libraries, etc., may be imaged, such that they can be automatically installed and processed in the target processing environment.

A "processing environment" refers to one or more physical processing devices organized within a local network. For example, several computers connected via a local area network (LAN) may collectively be viewed as a processing environment. The processing environment also refers to software configurations of the physical processing devices, such as but not limited to operating system, file system, directory service, etc. A single processing environment may be logically defined, such that it spans multiple different networks (e.g., multiple different LAN's, a LAN and a wide-area network (WAN), etc.).

An "identity service" refers to a special type of service that is designed to manage and supply authentication services and authentication information for resources. So, an identity service may authenticate a given resource for access to a variety of local and external services being managed by that identity service. A single resource may have multiple identity services. In addition the identity service itself may be viewed as a type of resource. In this manner, identity service may authenticate and establish trust with one another viewing one another as specific type of resource.

According to an embodiment, some example identity services are described in "Techniques for Dynamically Establishing and Managing Authentication and Trust Relationships," filed on Jan. 27, 2004, and having the U.S. Ser. No. 10/765,523; "Techniques for Establishing and Managing a Distributed Credential Store," filed on Jan. 29, 2004, and having the U.S. Ser. No. 10/767,884; and "Techniques for Establishing and Managing Trust Relationships," filed on Feb. 3, 2004, and having the U.S. Ser. No. 10/770,677; all of which are commonly assigned to Novell, Inc., of Provo, Utah and the disclosures of which are incorporated by reference herein.

An identity service may also provide single sign-on services to a resource. That is, a resource may sign-on to an identity service and acquire identities and credentials to access a variety of other services or resources. In some cases, the identity service is modified or enhanced to perform some of the teachings presented herein and below.

A resource is recognized via an "identity." An identity is authenticated via various techniques (e.g., challenge and response interaction, cookies, assertions, etc.) that use various identifying information (e.g., identifiers with passwords, biometric data, hardware specific data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given virtual processing environment, etc.).

The identity may also be a special type of identity that the resource assumes for a given context. For example, the identity may be a "crafted identity" or a "semantic identity." An example for creating and using crafted identities may be found in U.S. patent application Ser. No. 11/225,993; entitled "Crafted Identities;" filed on Sep. 14, 2005; and the disclosure of which is incorporated by reference herein. An example for creating and using semantic identities may be found in U.S. patent application Ser. No. 11/261,970; entitled "Semantic Identities;" filed on Oct. 28, 2005; and the disclosure of which is incorporated by reference herein.

Various embodiments of this invention can be implemented in existing network architectures, security systems, data centers, and/or communication devices. Any particular architectural layout or implementation presented herein is provided for purposes of illustration and comprehension only and is not intended to limit aspects or embodiments of the invention.

It is within this context, that various embodiments of the invention are now presented with reference to the FIGS. 1-4.

FIG. 1 is a diagram of a method 100 for packaging a project, according to an example embodiment. The method 100 (hereinafter "source stage packaging service") is implemented as instructions in a machine-accessible and readable medium. The instructions when executed by a machine perform the processing depicted in FIG. 1. The source stage packaging service is also operational over and processes within a network. The network may be wired, wireless, or a combination of wired and wireless.

As will be more fully described herein and below, the source stage packaging service permits a project to be packaged in a source stage along with an image or resources needed in a target stage and published to a holding or intermediate processing environment. The packaged project is subsequently pulled from the intermediate processing environment into its target stage when certain configurable conditions, events, and/or policies are satisfied.

At 110, the source stage packaging service packages configuration information and resources for a project within a source stage of a lifecycle for a project to create a self-contained project package. The source stage is associated with a source processing environment. The configuration information may include processing configuration information that a subsequent target processing environment associated with a target stage uses to configure, instantiate, and in some cases execute the resources. The self-contained package permits the needed resources for the target stage to be automatically and dynamically installed and initiated in the target processing environment when it is appropriate to do so.

In this manner, the target stage and target processing environment may, in some cases, be unknown or presently unavailable at the time that the source stage packaging service creates the self-contained project package. So, a project need not be delayed and need not consume resources in the source processing environment while the target stage and target processing environment is being resolved and established.

The self-contained project package also permits the target processing environment and the target stage to be portable, such as a laptop or even a personal digital assistant or a phone. This is so, because the resources and configuration information for the target processing environment are provided in the self-contained project package and can be pulled when appropriate to do so (discussed herein and below) and initiated on demand within the target processing environment. Traditional approaches rely on a push technique and cannot achieve this level or portability and flexibility. The creation of the self-contained project package facilitates this portability and flexibility along with the processing discussed more completely below.

According to an embodiment, at 111, the source stage packaging service images the first processing environment with respect to the resources that are used in the source stage and mapped to and needed in the target stage of the project's lifecycle. The image is used in combination with the configuration information to form or create the self-contained project package.

At 120, the source stage packaging service includes within the self-contained project package release and access criteria. The release criteria includes conditions, policies, and or event definitions that permit an intermediate holding area and its services (discussed below) to determine when the self-contained project package is to be released to the target processing environment via a target principal. The access criteria defines certification and/or authentication information that the services of the intermediate holding area can use to authenticate the target principal for pulling the self-contained project package to the target processing environment once the release criteria are satisfied.

In an embodiment, the access criteria may be acquired via an identity service, such as the identity services described in detail above and incorporated by reference herein.

In an embodiment, at 121, the source stage packaging service include in the release criteria a condition that masks or hides the self-contained project package from view of the authorized or target principal, who eventually attempts to pull the self-contained project package into the target processing environment. The self-contained project package is hidden or masked from the holding area and not the source processing environment, because as discussed more completely below the source stage packaging service eventually publishes or transmits the self-contained project package to the holding area and the authorized principal eventually tries to pull the package from the holding area and not the source processing environment.

Again, at 122, the source stage packaging service defines the condition as a policy, an event, and/or a manual approval instruction received from the source stage packaging service within the holding area when the source stage packaging service believes it is acceptable to make the self-contained project package (package) visible to and available to the authorized principal. In other words, the source stage packaging service can define a condition that hides the package and that condition may direct services of the holding area to not make the package viewable until the source stage packaging service indicates it is acceptable to do so.

In another case, at 123, the source stage packaging service adds an application programming interface (API) as a wrapper to the package. The API can be used in the holding area or even eventually in the target processing environment to describe the package, describe the target environment, and/or identify credentialing information for the access criteria. In some cases, the API can be a Simple Access Object Protocol (SOAP) envelope.

In another situation, at 124, the source stage packaging service adds auditing and compliance criteria or monitoring resources to the package for purposes of tracking, monitoring, and/or reporting on activities associated with the package when it is instantiated in the target processing environment for the target stage.

At 130, the source stage packaging service transmits the package and the release and access criteria to an external holding area and external processing environment for subsequent retrieval by an authorized or target principal when the release and the access criteria are properly satisfied.

In an embodiment, at 140, the source stage packaging service may transmit the package and the release and access criteria by publishing the information to a defined directory, database, secure website, file, etc. Services of the holding area scans these areas on an event being raised or periodically and detects the package and the release and access criteria and acquires the information for the external holding area.

The processing associated with establishing the package for a source stage or a project lifecycle and transmitting or publishing it to an external holding area was described with reference to the source stage packaging service. The processing associated with the external holding area and its administration of the package is discussed more completely below with reference to FIG. 2, which is now discussed in detail.

Figure 2:
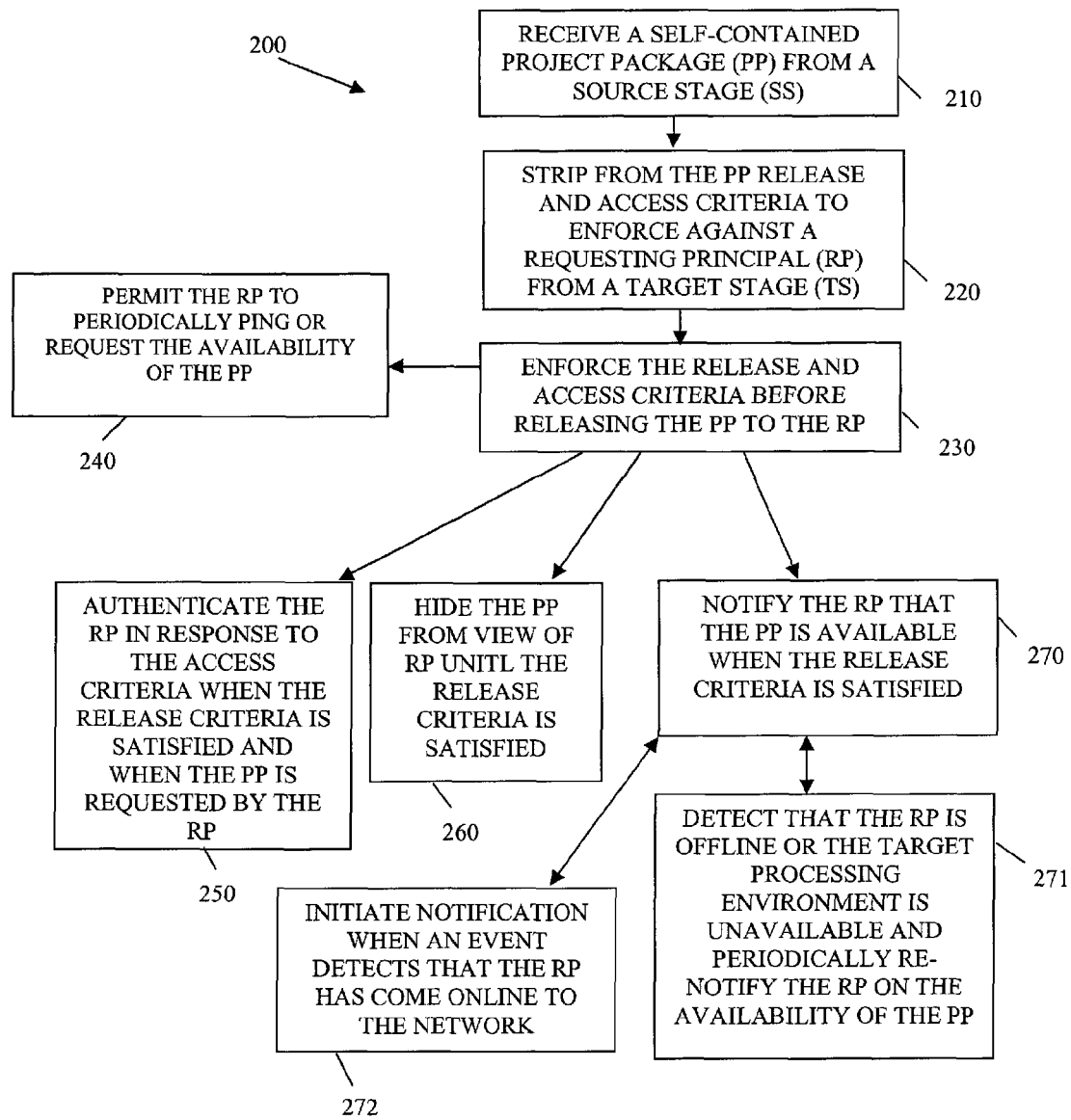
FIG. 2 is a diagram of a method for administering a self-contained project package, according to an example embodiment.

FIG. 2 is a diagram of a method 200 for administering a self-contained project package, according to an example embodiment. The method 200 (hereinafter "project holding administration service") is implemented as instructions in a machine-accessible and readable medium. The instructions when executed by a machine perform the processing depicted in FIG. 2. The project holding administration service is also operational over and processes within a network. The network may be wired, wireless, or a combination of wired and wireless.

The project holding administration service represents the processing that the source stage packaging service, represented by the method 100 discussed above with the FIG. 1, interacts with to publish the self-contained project package. The project holding administration service processes in a holding or intermediate processing environment that is external to and different from the source processing environment that processes the source stage packaging service. Communication between the services occurs over a network, such as a wide-area network (WAN) (e.g., Internet, World-Wide Web, etc.).

At 210, the project holding administration service receives a self-contained project package (package) from a source stage and a source processing environment over a network connection. The source stage is associated with a lifecycle of a project. The receipt of the package can be direct, such as when the source packaging service represented by the method 100 of the FIG. 1 transmits it to the project holding administration service. Alternatively, the receipt of the package can be indirect, such as when the project holding administration service detects and event raised from the source processing environment and pulls the package from a designated area or resource associated with the source processing environment or such as when the project holding administration service periodically scans the designated area or pings the resource for new packages published thereto.

At 220, the project holding administration service strips from the package release and access criteria to enforce against a requesting principal associated with a target stage and target processing environment that the package is eventually destined for. Example information associated with and contained in the release and access criteria was described in detail above with reference to the method 100 of the FIG. 1.

At 230, the project holding administration service actively enforces the release and access criteria before the package is released to the requesting principal. In other words, the project holding administration service is responsible for administering access to the package once it is received from the source processing environment.

According to an embodiment, at 240, the project holding administration service permits the requesting resource to periodically ping or request the availability of the package (assuming the release criteria permits such an arrangement).

In still another embodiment, at 250, the project holding administration service authenticates the requesting principal in response to the access criteria when the release criteria is satisfied and when the requesting principal actively requests the package. It may also be that the project holding administration service offloads the authentication or requests assistance for the authentication via an identity service, such as the types of identity services discussed above and incorporated by reference herein and above.

In yet another case, at 260, the project holding administration service hides the package from view and access of the requesting principal until the release criteria is satisfied. So, the requesting principal may not even be aware or be capable of knowing that the package is available or in the holding processing environment until the release criteria indicates that the project holding administration service can make the package visible and available.

In another situation, at 270, the project holding administration service notifies the requesting principal when the package is available and the release criteria is satisfied. So, the requesting principal may actively look for the package in the holding area or may passively wait for the project holding administration service to notify the requesting principal that the package is ready to be pulled from the holding area.

According to one notification scenario, at 271, the project holding administration service detects that the requesting principal is offline (not logged into the network connection) or the target processing environment is unavailable. In response to this situation, the project holding administration service periodically re-notifies the requesting principal on the availability of the package in an effort to eventually and successfully notify the requesting principal of the package's availability for the requesting principal to pull from the holding processing environment.

In another notification scenario, at 272, the project holding administration service initiates notification when an event detects that the requesting principal has come online to the network connection. So, rather than just periodically attempt to send notifications an event may be detected by the project holding administration service informing the project holding administration service that the requesting principal is available for notification that the package is available to pull from the holding processing environment.

Figure 3:
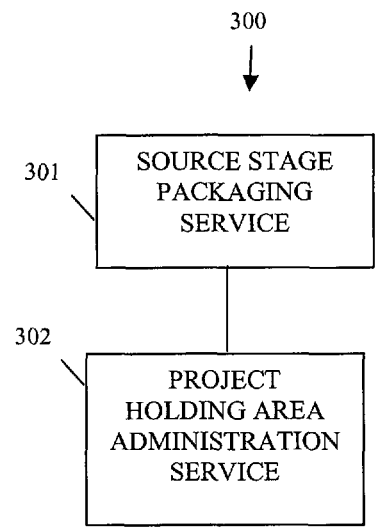
FIG. 3 is a diagram of a project packaging and administration system, according to an example embodiment.

FIG. 3 is a diagram of a project packaging and administration system 300, according to an example embodiment. The project packaging and administration system 300 is implemented as instructions on or within a machine-accessible and readable medium. The instructions when executed by one or more machines perform various aspects of the processing depicted with respect to the method 100 of the FIG. 1 and the method 200 of the FIG. 2. The project packaging and administration system 300 is also operational over a network and the network may be wired, wireless, or a combination of wired and wireless.

The project packaging and administration system 300 includes a source stage packaging service 301 and a project holding area administration service 302. Each of these components and their interactions with one another will now be discussed in turn.

The source stage packaging service 301 is implemented in a machine-accessible and readable medium and is to process on a machine associated with a source processing environment and a source stage of a lifecycle for a project. Example processing associated with the master project managing service 301 was described in detail above with reference to the source stage packaging service represented by the method 100 of the FIG. 1.

The source stage packaging service 301 images configuration information and resources associated with a source stage of a project's lifecycle within the source processing environment. These resources are to be eventually and subsequently transitioned and mapped to a target stage of the project's lifecycle within a target processing environment. The process of imaging the configuration information and the resources produces a self-contained project package (package).

In an embodiment, the source stage packaging service 301 includes release criteria with the package. The release criteria dictates when the project holding area administration service 302 can permit the package to be pulled from the holding area processing environment associated with the holding area administration service 302. The source stage packaging service 301 can also include access criteria. Examples of release and access criteria were discussed in detail above with reference to the methods 100 and 200 of the FIGS. 1 and 2, respectively.

The source stage packaging service 301 then delivers (directly or indirectly) the package to the project holding area administration service 302 for subsequent administration.

The project holding area administration service 302 is implemented in a machine-accessible and readable medium and is to process on a machine associated with a holding area processing environment and a holding or intermediate stage of the project's lifecycle. Example processing associated with the project holding area administration service 302 was described in detail above with reference to the project holding administration service represented by the method 200 of the FIG. 2.

The project holding area administration service 302 determines, in some cases in response to any release and access criteria, when the package can be permissibly pulled by the requesting resource from the holding area processing environment into the target processing environment.

According to an embodiment, the project holding area administration service 302 determines when it is acceptable to permit the package to be pulled in response to policy. The policy may accompany any release criteria or can be separate and distinct from the release criteria and obtained from a third-party, such as a policy store or an identity service (discussed above).

In another situation, the project holding area administration service 302 hides the package from view and access of the target principal until the project holding area administration service 302 determines that the package can be permissibly pulled from the holding area processing environment.

In another processing scenario, the project holding area administration service 302 actively notifies or regularly attempts to notify the target principal when the project holding area administration service 302 determines the package can be pulled by the target principal into the target processing environment.

It may also be that the project holding area administration service 302 actively authenticates or facilitates authentication of the target principal when the target principal attempts to pull the package from the holding area processing environment.

It is also noted that the source processing environment is different, external, and remote over a network from the holding area processing environment.

Figure 4:
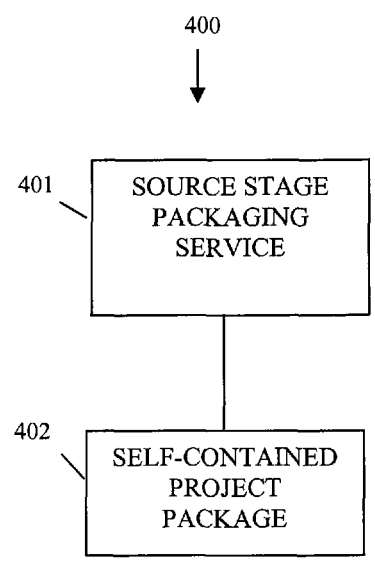
FIG. 4 is a diagram of a project packaging system, according to an example embodiment.

FIG. 4 is a diagram of a project packaging system 400, according to an example embodiment. The project packaging system 400 is implemented as instructions on or within a machine-accessible and readable medium. The instructions when executed by a machine perform various aspects of the processing depicted with respect to the method 100 of the FIG. 1, and processing associated with the system 300 of the FIG. 3. The project packaging system 400 is also operational over a network and the network may be wired, wireless, or a combination of wired and wireless.

The project packaging system 400 includes a source stage packaging service 401 and a self-contained project package 402. Each of these components and their interactions with one another will now be discussed in turn.

The source stage packaging service 401 is implemented in a machine-accessible and readable medium and is to process on a machine associated with a source processing environment and a source stage of a lifecycle for a project. Example processing of the project lifecycle management service 401 was described in detail above with reference to the methods 100 and the system 300 of the FIGS. 1 and 3, respectively.

The source stage packaging service 401 creates the self-contained project package 402 (package 402) and publishes (directly or indirectly) the package to an intermediate processing environment that is different and external to the source processing environment and the target processing environment. The target processing environment is eventually the destination of the package 402.

In an embodiment, the source stage packaging service 401 includes with the package release and access criteria with the published package. The release and access criteria instruct an intermediate service (such as the holding area administration service 302 of the system 300) within the intermediate processing environment on when it is permissible to release the package 402 to the target processing environment.

In yet another embodiment, the source stage packaging service 401 manually instructs the intermediate service processing within the intermediate processing environment on when it is permissible to release the package to the target processing environment via a pull operation by a target principal of the target processing environment.

In still another situation, the source stage packaging service 401 manually instructs the intermediate service to hide from view or services (including any target principal), associated with the target processing environment, the existence of the package 402 until policy is satisfied or until the source stage packaging service 401 manually notifies the intermediate service that is permissible to make the package 402 viewable and accessible from the intermediate processing environment.

In yet another case, the source stage packaging service 401 includes audit and compliance resources within the package 402. The audit and compliance resources process in the target processing environment when the package 402 is initiated in the target processing environment. When the audit and compliance resources execute in the target processing environment, they monitor, report, and/or tract on activities occurring in the target processing environment The package 402 is implemented in a machine-accessible and readable medium and is to be subsequently configured, installed, and processed in an automated manner within a target stage of the project's lifecycle within a target processing environment. The target processing environment is different, external, and remote over a network connection from the source processing environment.

Again, the source stage packaging service 401 creates the package 402. The package 402 includes configuration information and resources that are to be transitioned from the source stage, associated with the source processing environment, to the target stage, associated with the target processing environment.

As discussed in detail above, the package 402 can also include or be associated with other useful metadata, such as release and access criteria, auditing and compliance criteria or resources, policy, API's, etc.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented and residing in a non-transitory machine-readable medium and for execution on a machine, comprising:

packaging, by the machine, a first set of configuration information and resources for a project during a source stage of a project lifecycle of the project; wherein the project lifecycle comprises a plurality of project stages, and wherein the source stage of the project lifecycle is associated with a source processing environment;

creating a self-contained project package comprising the first set of configuration information and resources and a second set of configuration information and resources corresponding to a target processing environment, wherein the target processing environment is associated with a target stage of the project lifecycle;

including, by the machine, and within the self-contained project package, release criteria and access criteria, wherein the release criteria comprises one or more conditions to restrict release of the self-contained project package to the target processing environment, and wherein the access criteria comprises authentication information to identify a recipient principle resource of the target processing environment; and transmitting, by the machine, the self-contained project package to an intermediate holding area, wherein the recipient principal resource may retrieve the self-contained project package from the intermediate holding area into the the target processing environment when the release criteria and the access criteria are each satisfied.

2. The method of claim 1, wherein packaging comprises imaging the source processing environment for the first set of configuration information and resources during the source stage of the project lifecycle to create the self-contained project package.

3. The method of claim 1, wherein including the release criteria comprises:
including a condition that masks or hides the self-contained project package from view of the recipient principal resource until the condition is satisfied, at which time the self-contained project package becomes visible to the recipient principal resource.

4. The method of claim 3, wherein including the condition comprises:
defining a policy, an event, a manual approval instruction, or a combination thereof, received from the source processing environment.

5. The method of claim 1, comprising:
adding an application programming interface (API) to the self-contained project package, wherein the API is configured to describe the self-contained project package, to describe the target stage, and to identify credentialing information for the access criteria.

6. The method of claim 1, comprising:
adding auditing and compliance criteria and monitoring resources to the self-contained project package to respectively track and monitor the self-contained project package when the self-contained project package is instantiated in the target processing environment during the target stage of the project lifecycle.

7. The method of claim 1, wherein transmitting the self-contained project package comprises:
publishing the self-contained project package and the release and access criteria to a first stage principal, wherein the publishing results in the intermediate holding area receiving the self-contained project package and the release and access criteria.

8. A non-transitory computer-readable medium having computer executable code stored thereon, the code comprising instructions to:
prepare a project data package for transmission to a target processing environment during a source stage of a project development lifecycle, wherein the project data package comprises:
a first set of data corresponding to a configuration of the project data package during the source stage of the project lifecycle;
a second set of data to configure the project data package to correspond to the target processing environment, wherein the target processing environment is associated with a target stage of the project lifecycle;
a release criterion comprising one or more conditions that must be satisfied prior to release of the project data package to the target processing environment; and
an access criterion comprising authentication information to identify one or more recipient resources of the target processing environment that may access the project data package.

9. The non-transitory computer-readable medium of claim 8, wherein the code comprises instructions to transmit the project data package to a holding area processing environment before the transmission to the target processing environment.

10. The non-transitory computer-readable medium of claim 9, wherein the code comprises instructions to release access of the project data package to the one or more recipient resources in the target processing environment upon satisfaction of the release criterion.

* * * * *